United States Patent
Ikeda et al.

(10) Patent No.: US 10,768,547 B2
(45) Date of Patent: Sep. 8, 2020

(54) IMAGE FORMING APPARATUS

(71) Applicant: Konica Minolta, Inc., Tokyo (JP)

(72) Inventors: Kazuki Ikeda, Hachioji (JP); Makoto Ooki, Toyohashi (JP); Yoshihiro Inagaki, Hachioji (JP); Daisuke Kobayashi, Hino (JP); Mohdmakhtar Nurnabila, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/591,789

(22) Filed: Oct. 3, 2019

(65) Prior Publication Data

US 2020/0117110 A1 Apr. 16, 2020

(30) Foreign Application Priority Data

Oct. 16, 2018 (JP) .................. 2018-194976

(51) Int. Cl.
  *G03G 15/041* (2006.01)
  *G03G 15/04* (2006.01)
  *G02B 3/00* (2006.01)
(52) U.S. Cl.
  CPC ......... *G03G 15/041* (2013.01); *G02B 3/0062* (2013.01); *G03G 15/0409* (2013.01); *G03G 15/04036* (2013.01); *G03G 15/04045* (2013.01); *G03G 15/04054* (2013.01); *G03G 15/04063* (2013.01); *G02B 2003/0093* (2013.01);
  (Continued)
(58) Field of Classification Search
  CPC ............ G03G 15/041; G03G 15/0409; G03G 15/04036; G03G 15/04045; G03G 15/04054; G03G 15/04063; G03G 2215/04; G03G 2215/0402; G03G 2215/0407; G03G 2215/0409; G03G 2215/0412; G02B 3/0062; G02B 2003/0093
  See application file for complete search history.

(56) References Cited

U.S. PATENT DOCUMENTS

| 10,578,779 | B2 * | 3/2020 | Ooki | .................... G02B 3/0056 |
| 2009/0035020 | A1 * | 2/2009 | Sowa | .................. H04N 1/1935 |
| | | | | 399/218 |

(Continued)

FOREIGN PATENT DOCUMENTS

| JP | 2008221707 A | 9/2008 |
| JP | 2009051194 A | 3/2009 |

*Primary Examiner* — Ryan D Walsh
(74) *Attorney, Agent, or Firm* — Lucas & Mercanti, LLP

(57) ABSTRACT

An image forming apparatus includes a photoconductor, a light emitting substrate, and imaging optical systems, wherein an optical axis of the imaging optical systems are parallel, imaging magnifications of the imaging optical systems are substantially equal for the light emitting point groups, the imaging optical systems includes a first lens array, a second lens array, and apertures, central points of the light emitting point group exist in a first plane, central points of the imaging lenses exist in a second plane, central points of the apertures exist in a third plane, central points of the imaging lenses exist in a fourth plane, the first plane forms a non-zero predetermined angle with respect to a plane perpendicular to an optical axis direction, and the angle formed with respect to the plane perpendicular to the optical axis direction is greater in the order of the first, second, third, and the fourth plane.

11 Claims, 5 Drawing Sheets

(52) U.S. Cl.
CPC . *G03G 2215/04* (2013.01); *G03G 2215/0402* (2013.01); *G03G 2215/0407* (2013.01); *G03G 2215/0409* (2013.01); *G03G 2215/0412* (2013.01)

(56) References Cited

U.S. PATENT DOCUMENTS

| | | | |
|---|---|---|---|
| 2013/0135694 A1* | 5/2013 | Yamamura | H04N 1/1017 358/474 |
| 2018/0088256 A1* | 3/2018 | Yamamura | G03G 15/0435 |
| 2019/0094747 A1* | 3/2019 | Yamamura | G02B 3/0037 |
| 2019/0310566 A1* | 10/2019 | Matsuo | G02B 27/30 |
| 2020/0133157 A1* | 4/2020 | Inagaki | G03G 15/04036 |

* cited by examiner

IMAGE FORMING APPARATUS

The entire disclosure of Japanese patent Application No. 2018-194976, filed on Oct. 16, 2018, is incorporated herein by reference in its entirety.

BACKGROUND

Technological Field

The present invention relates to an image forming apparatus having an optical writing unit, and more particularly to an image forming apparatus including an imaging optical system that forms an image of a light emitting point group on a light receiving surface.

Description of the Related Art

There is a conventionally known image forming apparatus that includes an optical writing unit including: a light emitting substrate having a plurality of light emitting point groups of a plurality of light emitting points arranged in a main direction and a sub direction; and a lens array having imaging lenses disposed to face the light emitting point groups on a one-to-one basis. In an optical writing unit of such an image forming apparatus, a light beam emitted from a light emitting point goes through an imaging lens to be formed into a desired beam spot at a desired position on a photoconductor. At this time, a particularly important point is positional accuracy of the beam. Deviation of the beam from the desired position even by 1am would cause an image defect such as streak-like unevenness. Furthermore, when using a light emitting point such as an organic light emitting diode (OLED), the light emission life would be a problem. Therefore, it is desirable to reduce the variation in the size of the light emitting point facing each of imaging lenses as much as possible. This is because large variation in the light emitting point size directly leads to large variation in the life of the light emitting point. It is desirable for an imaging optical system to achieve uniform sizes of the light emitting points and the beam spots as much as possible, that is, to achieve uniform magnification in all the lenses. To cope with this, JP 2009-51194A provides a bi-telecentric optical system in which decentering of lens surface would not easily cause beam positional deviation. Furthermore, this optical system achieves uniform magnification of lenses.

There are cases where light emitting point groups in the optical writing unit are not on an identical plane, that is, the positions of the light emitting point groups in the optical axis direction are different (JP 2008-221707 A). In this manner, there is a conceivable case where the light emitting point groups are not on an identical plane, that is, the positions of the light emitting point groups in the optical axis direction are different. This means that the distance from each of light emitting point groups to the lens array is not uniform. Applying such a restriction to an image forming apparatus such as in JP 2009-51194 A would lead to a difficulty in achieving uniform magnification while ensuring bi-telecentricity.

SUMMARY

The present invention has been made in view of the above known technology, and aims to provide an image forming apparatus including an optical writing unit capable of achieving uniform magnification while ensuring bi-telecentricity when the light emitting point groups are not on an identical plane.

To achieve the abovementioned object, according to an aspect of the present invention, an image forming apparatus reflecting one aspect of the present invention comprises a photoconductor having a surface conveyed in a sub direction substantially orthogonal to a main direction, a light emitting substrate having a plurality of two-dimensionally arrayed light emitting point groups, and a plurality of imaging optical systems that images light from the plurality of light emitting point groups onto mutually different positions on the photoconductor, wherein an optical axis of each of the plurality of imaging optical systems are parallel to one another, imaging magnifications of the plurality of imaging optical systems are substantially equal for each of the light emitting point groups, the plurality of imaging optical systems includes: a first lens array having a plurality of imaging lenses arranged to face the light emitting point groups; a second lens array having a plurality of imaging lenses each arranged to face each of the plurality of imaging lenses constituting the first lens array; and a plurality of apertures arranged between the first and second lens arrays so as to face the plurality of imaging lenses, central points of the light emitting point group exist in a first plane which is substantially an identical plane, central points of the plurality of imaging lenses constituting the first lens array exist in a second plane which is substantially an identical plane, central points of the plurality of apertures exist in a third plane which is substantially an identical plane, central points of the plurality of imaging lenses constituting the second lens array exist in a fourth plane which is substantially an identical plane, the first plane forms a non-zero predetermined angle with respect to a plane perpendicular to an optical axis direction, and the angle formed with respect to the plane perpendicular to the optical axis direction is greater in the order of the first plane, the second plane, the third plane, and the fourth plane.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
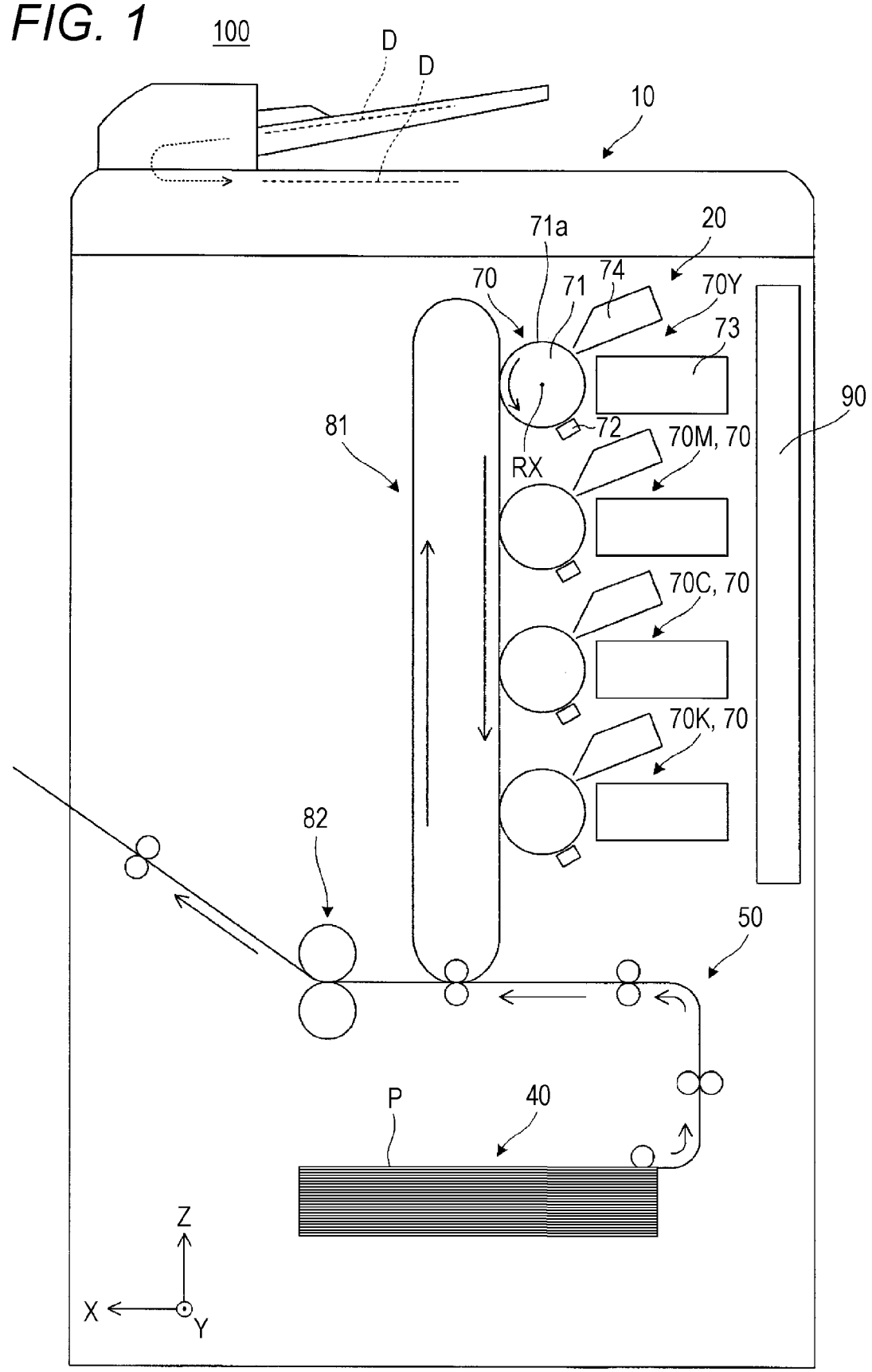
FIG. 1 is a partial cross-sectional view illustrating a schematic configuration of an image forming apparatus of an embodiment.

As illustrated in FIG. 1, an image forming apparatus 100 according to an embodiment is used as a digital copier, for example, and includes: an image reader 10 that reads a color image formed on a document D; an image forming part 20 that forms an image corresponding to the document D, on a sheet P; a sheet feeder 40 that feeds the sheet P to the image forming part 20; a conveyor 50 that conveys the sheet P; and a controller 90 that performs administrative control of operation of the entire apparatus.

The image forming part 20 includes: image forming units 70C, 70M, 70Y, and 70K provided for each of cyan, magenta, yellow, and black, respectively, and an intermediate transfer unit 81 on which a toner image obtained by combining each of colors is formed; and a fixing unit 82 that fixes the toner image.

The image forming unit 70Y, among the image forming part 20, is a part that forms an image of yellow (Y) color, and includes a photoconductive drum 71, a charging part 72, an optical print head (optical writer) 73, and a developing part 74. The photoconductive drum 71 forms a Y-color toner image. The charging part 72 is disposed on a periphery of the photoconductive drum 71 and charges the surface of the photoconductive drum 71 as a photoconductor using corona discharge. The optical print head 73 emits light corresponding to the image of the Y-color component toward the photoconductive drum 71. The developing part 74 applies the toner of the Y-color component to the surface of the photoconductive drum 71 to form a toner image from an electrostatic latent image. The photoconductive drum 71 has a cylindrical shape and rotates about a rotational axis RX. The cylindrical surface of the photoconductive drum 71 is a light receiving surface 71a on which an image from the optical print head 73 is formed.

The other image forming units 70M, 70C, and 70K have structures and functions similar to the case of the image forming unit 70Y for Y color except for the difference in the color of the image to be formed, and thus the description thereof is omitted. The image forming unit 70 represents any unit out of the image forming units 70Y, 70M, 70C and 70K of four colors, and includes, as a component adapted to each of colors, the photoconductive drum 71, the charging part 72, the optical print head 73, and the developing part 74.

Figure 2:
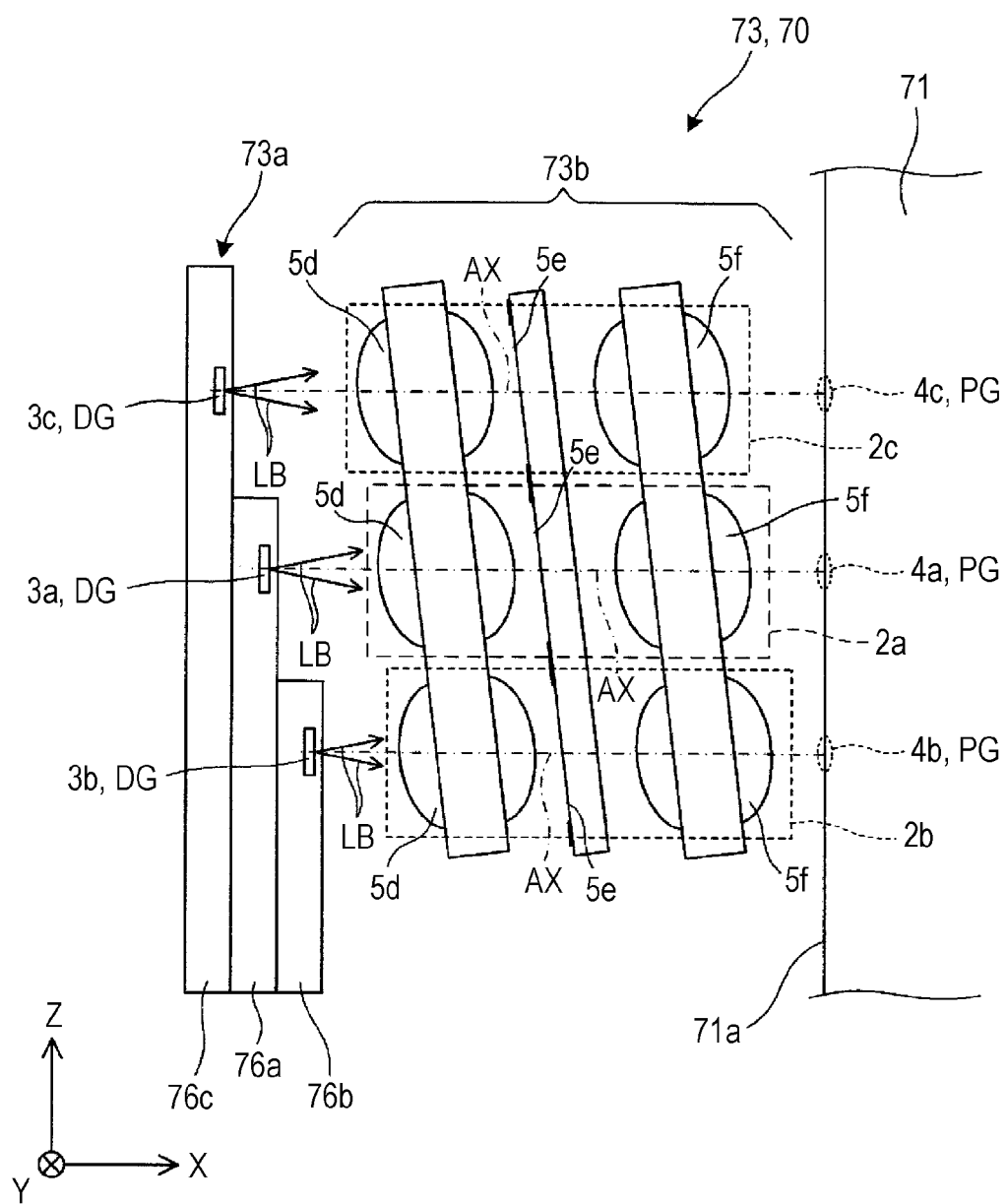
FIG. 2 is a conceptual side view illustrating a structure of an optical print head constituting an image forming unit.

FIG. 2 is a side view of the optical print head 73. The optical print head 73 includes: a light emitting element 73a having light emitting regions 3a, 3b and 3c in which light emitting point groups DG two-dimensionally arranged are formed; and an optical system 73b including imaging systems 2a, 2b and 2c that respectively allows the light from the light emitting point group DG of each of the light emitting regions 3a, 3b and 3c to form an image on the light receiving surface 71a of the photoconductive drum (photoconductor) 71. The imaging systems 2a, 2b and 2c are arranged at equal intervals in the direction of the upper and lower ±Z axes. The imaging systems 2a, 2b and 2c are bi-telecentric and equal in imaging magnification, although they do not have exactly the same shape and they are slightly different in size in the directions of the left and right ±X axes. Here, the Y axis parallel to the rotational axis RX of the photoconductive drum 71 corresponds to a main scanning direction or a main direction, and the Z axis orthogonal to the rotational axis RX of the photoconductive drum 71 and extending perpendicular to an optical axis AX corresponds to a sub scanning direction or sub direction. That is, the optical print head 73 includes the light emitting regions 3a, 3b and 3c provided at three locations in the vertical sub scanning direction, and includes the imaging systems 2a, 2b and 2c provided corresponding to each of the three regions, respectively. The imaging systems 2a, 2b and 2c are positioned relative to each other by a holder (not illustrated) and are positioned and secured with respect to the light emitting element 73a.

Figure 3A:
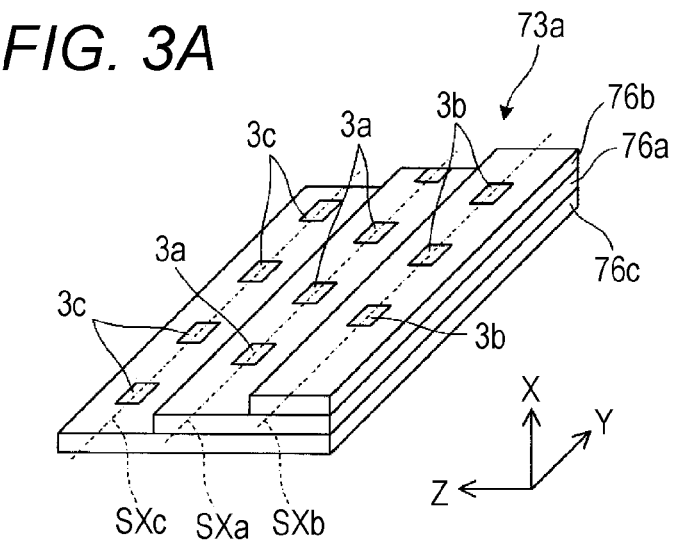
FIG. 3A is a conceptual perspective view illustrating a structure of a light emitting element.

As illustrated in FIG. 3A, the light emitting element 73a has a three-layer structure in which three light emitting substrates 76a, 76b and 76c are stacked in the X-axis direction perpendicular to the optical axis AX. On each of the light emitting substrates 76a, 76b, and 76c, the light emitting regions 3a, 3b, and 3c are formed at predetermined intervals respectively along reference lines SXa, SXb, and SXc extending in the Y direction. That is, the light emitting regions 3a, 3b, 3c are two-dimensionally arranged. The light emitting region 3b on the upper layer side (that is, the lower side in FIG. 2) is disposed to be shifted in a direction closer to the photoconductive drum 71 on the +X side with respect to the light emitting region 3a in the middle. The light emitting region 3c on the lower layer side (that is, the upper side in FIG. 2) is disposed to be shifted in a direction away from the photoconductive drum 71 on the −X side with respect to the light emitting region 3a in the middle. The centers of the light emitting regions 3a, 3b and 3c are disposed on an identical plane, which will be described in detail below.

Figure 3B:
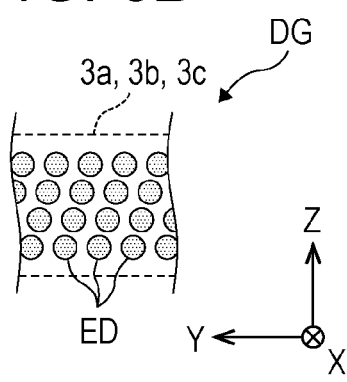
FIG. 3B is a view illustrating a light emitting point group provided in the light emitting element.

FIG. 3B is a partially enlarged back view illustrating arrangement of the light emitting point group DG or the light emitting points ED formed in the single light emitting region 3a. The vertical direction of the drawing is the sub scanning direction (sub direction), and the horizontal direction of the drawing is the main scanning direction (main direction). The light emitting points ED forming the light emitting point group DG are arrayed at equal intervals in the Y direction corresponding to the main scanning direction, and are also arrayed at equal intervals in a direction inclined to the Z direction corresponding to the sub scanning direction. Each of the light emitting points ED has a diameter of 30 µ, for example, being arranged in the main direction at a 10.6 µm pitch corresponding to one dot of 2400 dpi. Although not illustrated, there are 32 light emitting points per row, and a total of 128 light emitting points are arranged in a parallelogram matrix in four rows as a whole.

Figure 3C:
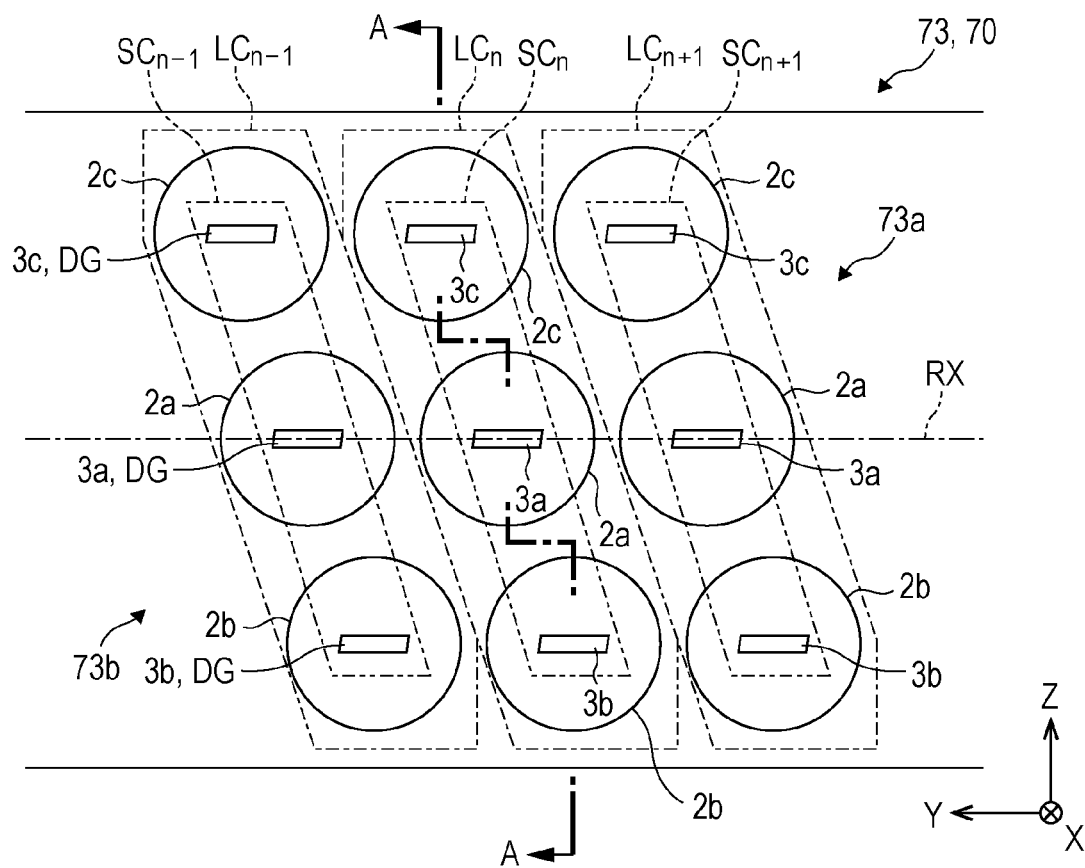
FIG. 3C is a view illustrating arrangement of light emitting point groups and lenses.

As illustrated in FIG. 3C, the light emitting element 73a includes a light emitting set SCn (n=1, 2, 3, . . . ) having three adjacent light emitting regions 3a, 3b and 3c as one set repeatedly arranged at equal intervals in the Y direction. Note that FIG. 1 corresponds to the A-A cross section of FIG. 3C. The light emitting regions 3a, 3b, and 3c constituting the light emitting set SCn are arranged at mutually different positions with respect to the main scanning direction or the Y direction, as well as being arranged at mutually different positions with respect to the sub scanning direction or the Z direction. Similarly, the optical system 73b includes an imaging set LCn (n=1, 2, 3, . . . ) having three adjacent imaging systems 2a, 2b and 2c as one set repeatedly arranged at equal intervals in the Y direction. The imaging systems 2a, 2b, and 2c constituting the imaging set LCn are arranged at mutually different positions with respect to the main scanning direction or the Y direction, as well as being arranged at mutually different positions with respect to the sub scanning direction or the Z direction. In the specific example, about 100 imaging systems 2a, 2b, 2c are provided per one row extending in the Y direction, and a total of 287 imaging systems 2a, 2b, and 2c or light emitting regions 3a, 3b, and 3c are arranged in a parallelogram matrix as a whole.

Returning to FIG. 2, each of the imaging systems 2a, 2b, and 2c of the optical system 73b has a first imaging lens 5d, an aperture 5e, and a second imaging lens 5f. The first imaging lens 5d collimates a light beam LB from the light emitting region 3a. The second imaging lens 5f collects the light beam LB from the first imaging lens 5d and projects an image of the light emitting regions 3a, 3b and 3c onto the light receiving surface 71a of the photoconductive drum 71. This results in formation, in the light receiving regions 4a, 4b and 4c on the light receiving surface 71a, of a projected image group PG having the same pattern and having the same or different magnifications compared to the light emitting point group DG arrayed two-dimensionally and formed in the light emitting regions 3a, 3b and 3c. A plurality of the first imaging lenses 5d constituting the optical system 73b is arrayed two-dimensionally, and the centers thereof are arranged on an identical plane, which will be described in detail below. A plurality of the apertures 5e constituting the optical system 73b is arrayed two-dimensionally, and the centers thereof are disposed on an identical plane. The plurality of second imaging lenses 5f constituting the optical system 73b is arrayed two-dimensionally, and the centers thereof are arranged on an identical plane.

Figure 4:
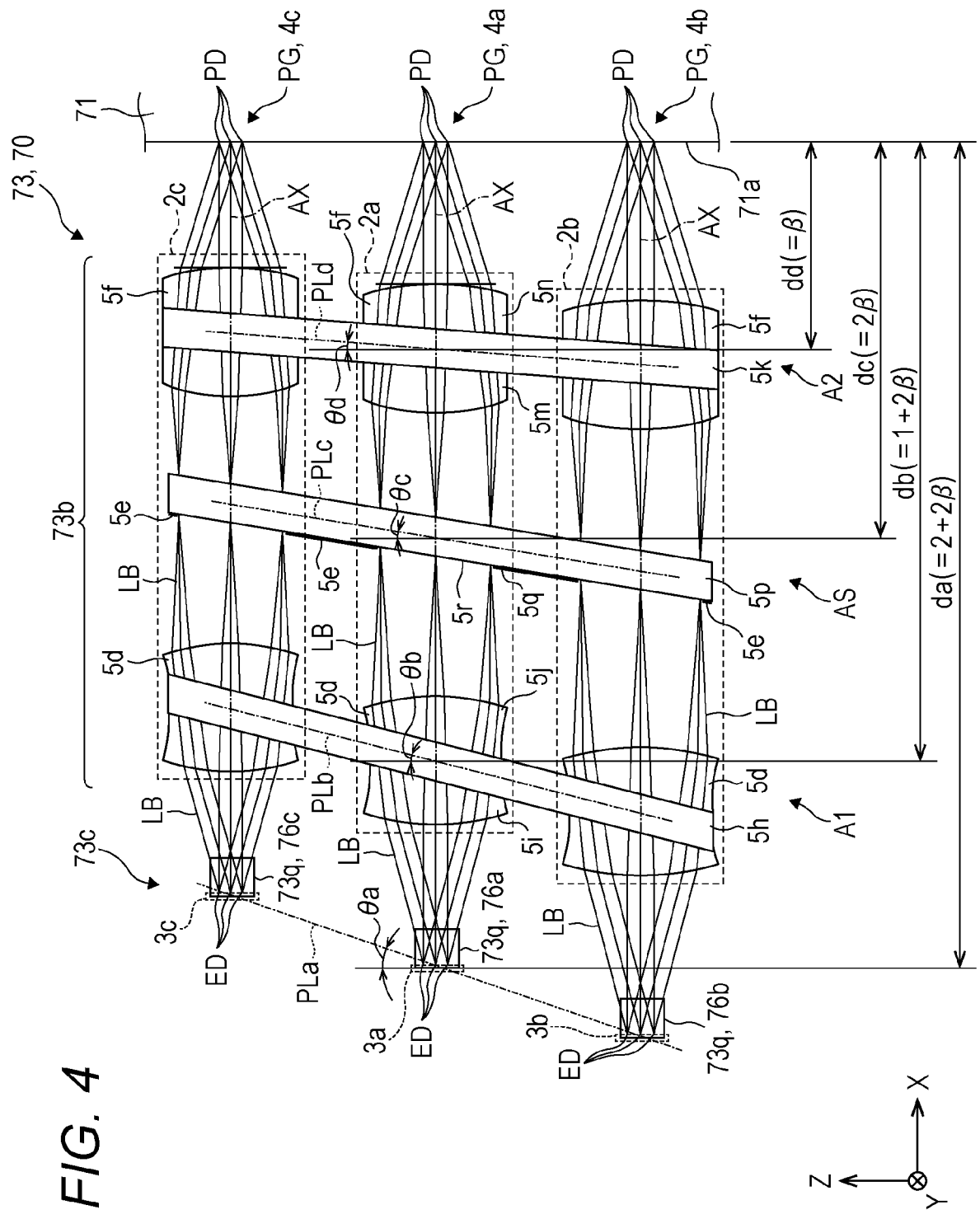
FIG. 4 is a front view illustrating a specific optical system of an optical print head.

As illustrated in FIG. 4, the first imaging lens 5d is a convex lens, and more specifically, has the lens shape of biconvex in the vicinity of the optical axis. In the illustrated example, the first imaging lens 5d has a configuration in which lens portions 5i and 5j formed of resin are provided on both sides of a common lens substrate 5h formed of glass or the like. That is, the lens surfaces of the lens portions 5i and 5j are formed of resin. The first imaging lenses 5d disposed at three different positions in the sub scanning direction constitute a first lens array A1. The aperture 5e is formed by a large number of openings 5r in a light shielding part 5q provided on one side of the glass aperture substrate 5p and formed of a layered light shielding body. The aperture substrate 5p is a transparent body, and transmits each of cyan, magenta, yellow and black colors. Here, the aperture 5e can be formed on the image side, rather than the light source side, of the aperture substrate 5p. The apertures 5e arranged at three different positions in the sub scanning direction constitute an aperture array AS. The second imaging lens 5f is a convex lens, and more specifically, has a lens shape of biconvex in the vicinity of the optical axis. In the illustrated example, the second imaging lens 5f has a configuration in which lens portions 5m and 5n formed of resin are provided on both sides of a common lens substrate 5k formed of glass or the like. That is, the lens surfaces of the lens portions 5m and 5n are formed of resin. The second imaging lenses 5f disposed at three different positions in the sub scanning direction constitute a second lens array A2. The optical axis AX of each of the imaging systems 2a, 2b and 2c is parallel to each other, and perpendicular to the light emitting point group DG of the light emitting regions 3a, 3b and 3c and to the light receiving surface 71a of the photoconductive drum (photoconductor) 71.

Each of the light emitting substrates 76a, 76b, and 76c constituting the light emitting element 73a is a bottom emission type organic EL element in which light emitting points are two-dimensionally arrayed on a glass plate 73q. Each of the light emitting point groups DG constituting the light emitting element 73a is projected as a projected image group PG on the light receiving surface 71a. The projected image group PG includes a large number of projected images PD corresponding to a large number of light emitting points ED.

In the light emitting element 73a, the centers of the light emitting regions 3a, 3b, and 3c arrayed two-dimensionally are arranged on the common first plane PLa, which has a non-zero predetermined angle, that is, an angle $\theta_a$, with respect to a YZ plane substantially parallel to a counter region on the light receiving surface 71a of the photoconductive drum 71. In the optical system 73b, the center of the first imaging lens 5d out of the imaging systems 2a, 2b and 2c is disposed on a common second plane PLb, which has an angle $\theta_b$ with respect to the YZ plane. The center of the aperture 5e, out of the imaging systems 2a, 2b and 2c, is disposed on a common third plane PLc, which has an angle $\theta_c$ with respect to the YZ plane. The center of the second imaging lens 5f, out of the imaging systems 2a, 2b and 2c, is disposed on a common fourth plane PLd, which has an angle $\theta_d$ with respect to the YZ plane. The first plane PLa, the second plane PLb, the third plane PLc, and the fourth plane PLd are inclined with respect to the sub direction or the sub scanning direction with respect to the YZ plane perpendicular to the optical axis AX direction, but have no inclination components in the main scanning direction. That is, the planes PLa, PLb, PLc, and PLd are inclined along an XZ plane.

As observed from the figures, angles formed by the first plane PLa, the second plane PLb, the third plane PLc, and the fourth plane PLd with respect to the YZ plane perpendicular to the optical axis AX direction are greater in the order of the first plane PLa, the second plane PLb, the third plane PLc, and the fourth plane PLd. More specifically, angles $\theta_a$ to $\theta_d$ formed by the first to fourth planes PLa to PLd with respect to the YZ plane gradually decreases from the angle $\theta_a$ toward the angle $\theta_d$ with the angle $\theta_a$ as the maximum value and the angle $\theta_d$ as the minimum value.

The angles $\theta_a$, $\theta_b$, $\theta_c$, and $\theta_d$, which are respectively the inclination angles of the first plane PLa, the second plane PLb, the third plane PLc, and the fourth plane PLd, satisfy the following relationships (1), (2), and (3) when the magnification obtained by combining the first imaging lens 5d included in the first lens array A1 and the second imaging lens 5f included in the second lens array A2 is β.

$$\frac{\alpha(1+2\beta)}{2+2\beta}\theta_a < \theta_b < \frac{\gamma(1+2\beta)}{2+2\beta}\theta_a \quad (1)$$

$$\frac{2\alpha\beta}{2+2\beta}\theta_a < \theta_c < \frac{2\gamma\beta}{2+2\beta}\theta_a \quad (2)$$

$$\frac{\alpha\beta}{2+2\beta}\theta_a < \theta_d < \frac{\gamma\beta}{2+2\beta}\theta_a \quad (3)$$

wherein α=0.9, and γ=1.1.

The imaging systems 2a, 2b, and 2c have achieved bi-telecentricity and magnification uniformity. In this manner, in order to achieve substantially equal magnification in each of imaging optical systems while achieving bi-telecentricity, for example, the relationship, with respect to the imaging system 2a, in the interval from the center of the light emitting region 3a of the light emitting substrate 76a to the center of the first imaging lens 5d, the interval from the center of the first imaging lens 5d to the center of the aperture 5e, the interval from the center of the aperture 5e to the second imaging lens 5f, and the interval from the second imaging lens 5f to the light receiving region 4a of the light receiving surface 71a would be 1:1:β:β. Such a relationship holds not only for the imaging system 2a but also for the imaging systems 2b and 2c, and the light receiving surface 71a can be treated approximately as a plane. Therefore, ratio of intervals in the optical axis AX direction regarding the light emitting regions 3a to 3c or the light emitting point group DG of the light emitting substrates 76a to 76c, the first imaging lens 5d of the first lens array A1, the aperture 5e, the second imaging lens 5f of the second lens array A2, and the light receiving regions 4a to 4c on the light receiving surface 71a can be ideally defined as follows using the magnification β.

$$\theta_a : \theta_b : \theta_c : \theta_d = 2+2\beta : 1+2\beta : 2\beta : \beta \quad (4)$$

Here, $2+2\beta$ is a relative value corresponding to a distance da from the light emitting regions 3a to 3c to the light receiving regions 4a to 4c; $1+2\beta$ is a relative value corresponding to a distance db from the center of the first imaging lens 5d to the light receiving regions 4a to 4c; $2\beta$ is a relative value corresponding to a distance dc from the center of the aperture 5e to the light receiving regions 4a to 4c; and β is a relative value corresponding to a distance dd from the center of the second imaging lens 5f to the light receiving regions 4a to 4c. The following Formulas (5) to (7):

$$\theta_b = \frac{(1+2\beta)}{2+2\beta} \theta_a \quad (5)$$

$$\theta_c = \frac{2\beta}{2+2\beta} \theta_a \quad (6)$$

$$\theta_d = \frac{\beta}{2+2\beta} \theta_a \quad (7)$$

are obtained from Equation (4), leading to determination of optimum values of the angles $\theta_b$, $\theta_c$, and $\theta_d$ with respect to the angle $\theta_a$ being the inclination angle of the first plane PLa set in the light emitting element 73a. Inclining each of the second to fourth planes PLb to PLd, that is, inclining the first lens array A1, the aperture array AS, and the second lens array A2 so as to be within a ±10% range with respect to these optimum angles would make it possible to achieve practically sufficient effects for ensuring bi-telecentricity and magnification uniformity.

As apparent from the above description, according to the image forming apparatus 100 of the embodiment, the angle formed with respect to the YZ plane perpendicular to the optical axis AX direction is greater in the order of the first plane PLa, the second plane PLb, the third plane PLc, and the fourth plane PLd. Accordingly, it is possible, regarding the light emitting point group DG of the light emitting substrates 76a, 76b and 76c, the imaging lens 5d of the first lens array A1, and the aperture 5e, the imaging lens 5f of the second lens array A2, and the light receiving surface 71a of the photoconductive drum 71, to achieve substantial matching in the distribution relationship of the intervals in the optical axis AX direction between the plurality of imaging systems 2a, 2b and 2c. This leads to easy reduction of variation in magnification while achieving bi-telecentricity in each of the imaging systems 2a, 2b and 2c.

EXAMPLES

Hereinafter, specific examples of the optical system 73b incorporated in the image forming apparatus 100 will be described.

Example 1

The optical system 73b in Example 1 is the same as that illustrated in FIG. 4. The following Table 1 summarizes basic specifications of the optical system 73b in Example 1. In Table 1, the lower imaging system corresponds to the imaging system 2b of FIG. 4, the central imaging system correspond to the imaging system 2a of FIG. 4, and the upper imaging system corresponds to the imaging system 2c of FIG. 4.

TABLE 1

|  | Lower imaging system | Central imaging system | Upper imaging system |
|---|---|---|---|
| Sub object height X | ±0.200 | ±0.200 | ±0.200 |
| Main object height Y | ±0.700 | ±0.700 | ±0.700 |
| Object-side numerical aperture | 0.270 | 0.270 | 0.270 |
| Imaging magnification β | −1.000 | −1.000 | −1.000 |

[1-a: Central imaging system]

Data of the central imaging system 2a will be described below. Table 2 tabulates the coordinates of the surface vertex of the optical surface of the imaging lens (first imaging lens) 5d, the aperture 5e, and the imaging lens (second imaging lens) 5f constituting the central imaging system 2a. The unit of distance is mm. For light of wavelength 650 nm, the refractive index of the lens substrate is 1.5145, and the refractive index of the resin lens portion provided between the lens surface and the glass substrate is 1.5285. The imaging magnification β is −1 for all optical systems. The above can similarly be applied to the upper and lower imaging systems, in addition to the central imaging system.

TABLE 2

|  | X | Y | Z | Angle |
|---|---|---|---|---|
| Light emitting point group | 0.000 | 0.000 | 0.000 | 21.251 |
| Exit surface of light emitting substrate | 0.000 | 0.000 | 0.700 |  |
| Front surface of first imaging lens | 0.000 | 0.000 | 2.750 |  |
| Lens substrate | 0.000 | 0.000 | 3.650 | 16.260 |
|  | 0.002 | 0.000 | 4.351 | 16.260 |
| Back surface of first imaging lens | 0.002 | 0.000 | 5.250 |  |
| Aperture substrate | 0.001 | 0.000 | 8.000 | 11.004 |
|  | −0.045 | 0.000 | 8.691 | 11.004 |
| Front surface of second imaging lens | −0.045 | 0.000 | 10.750 |  |
| Lens substrate | −0.046 | 0.000 | 11.650 | 5.553 |
|  | −0.045 | 0.000 | 12.350 | 5.553 |
| Back surface of second imaging lens | −0.045 | 0.000 | 13.250 |  |
| Surface of photoconductor | −0.047 | 0.000 | 16.000 |  |

The free curved surface shape of the central imaging system 2a is tabulated in Table 3. When the local coordinates corresponding to X, Y, and Z are x, y, and z, the formula for the free curved surface shapes described in the table is:

$$x = \sum_i \sum_j C_{ij} \cdot y^i z^j$$

Note that aspheric coefficients $C_{ij}$ not illustrated in the table are all zero. These conditions are similar in the following.

TABLE 3

| j | i=0 | 2 | 4 | 6 | 8 | 10 |
|---|---|---|---|---|---|---|
| Front surface of first imaging lens | | | | | | |
| 0 | 0.00000E+00 | 1.41797E−01 | −3.68779E−03 | 6.60000E−05 | 8.50000E−05 | 0.00000E+00 |
| 2 | 1.43934E−01 | −1.99124E−02 | 2.19844E−03 | −5.75590E−04 | 0.00000E+00 | 0.00000E+00 |
| 4 | −6.11216E−03 | 1.76930E−03 | −6.09951E−04 | 0.00000E+00 | 0.00000E+00 | 0.00000E+00 |
| 6 | 2.65501E−03 | −5.48731E−04 | 0.00000E+00 | 0.00000E+00 | 0.00000E+00 | 0.00000E+00 |
| 8 | −1.18327E−04 | 0.00000E+00 | 0.00000E+00 | 0.00000E+00 | 0.00000E+00 | 0.00000E+00 |
| 10 | 0.00000E+00 | 0.00000E+00 | 0.00000E+00 | 0.00000E+00 | 0.00000E+00 | 0.00000E+00 |
| Back surface of first imaging lens | | | | | | |
| 0 | 0.00000E+00 | −1.59156E−01 | 5.07932E−03 | −5.52995E−04 | 1.24475E−04 | 0.00000E+00 |
| 2 | −1.60146E−01 | 8.22002E−03 | −1.04574E−03 | −4.50847E−04 | 0.00000E+00 | 0.00000E+00 |
| 4 | 3.36547E−03 | −2.15846E−03 | 3.88435E−04 | 0.00000E+00 | 0.00000E+00 | 0.00000E+00 |
| 6 | 7.23466E−04 | −3.18315E−04 | 0.00000E+00 | 0.00000E+00 | 0.00000E+00 | 0.00000E+00 |
| 8 | 1.85420E−04 | 0.00000E+00 | 0.00000E+00 | 0.00000E+00 | 0.00000E+00 | 0.00000E+00 |
| 10 | 0.00000E+00 | 0.00000E+00 | 0.00000E+00 | 0.00000E+00 | 0.00000E+00 | 0.00000E+00 |
| Front surface of second imaging lens | | | | | | |
| 0 | 0.00000E+00 | 1.54202E−01 | −5.78930E−03 | 4.53883E−04 | −1.22683E−04 | 0.00000E+00 |
| 2 | 1.46082E−01 | −1.15578E−02 | 4.00822E−03 | −5.84573E−04 | 0.00000E+00 | 0.00000E+00 |
| 4 | −5.75353E−03 | 4.33240E−03 | −2.83792E−03 | 0.00000E+00 | 0.00000E+00 | 0.00000E+00 |
| 6 | −7.90982E−04 | 1.52788E−04 | 0.00000E+00 | 0.00000E+00 | 0.00000E+00 | 0.00000E+00 |
| 8 | −2.45347E−04 | 0.00000E+00 | 0.00000E+00 | 0.00000E+00 | 0.00000E+00 | 0.00000E+00 |
| 10 | 0.00000E+00 | 0.00000E+00 | 0.00000E+00 | 0.00000E+00 | 0.00000E+00 | 0.00000E+00 |
| Back surface of second imaging lens | | | | | | |
| 0 | 0.00000E+00 | −1.47113E−01 | 3.19398E−03 | −2.40365E−04 | −5.80000E−05 | 0.00000E+00 |
| 2 | −1.58121E−01 | 1.56166E−02 | −1.40000E−05 | −2.22661E−04 | 0.00000E+00 | 0.00000E+00 |
| 4 | 3.63885E−03 | 6.60418E−04 | −1.04548E−03 | 0.00000E+00 | 0.00000E+00 | 0.00000E+00 |
| 6 | −2.07841E−03 | −2.40000E−05 | 0.00000E+00 | 0.00000E+00 | 0.00000E+00 | 0.00000E+00 |
| 8 | 7.30000E−05 | 0.00000E+00 | 0.00000E+00 | 0.00000E+00 | 0.00000E+00 | 0.00000E+00 |
| 10 | 0.00000E+00 | 0.00000E+00 | 0.00000E+00 | 0.00000E+00 | 0.00000E+00 | 0.00000E+00 |

Figure 5A:
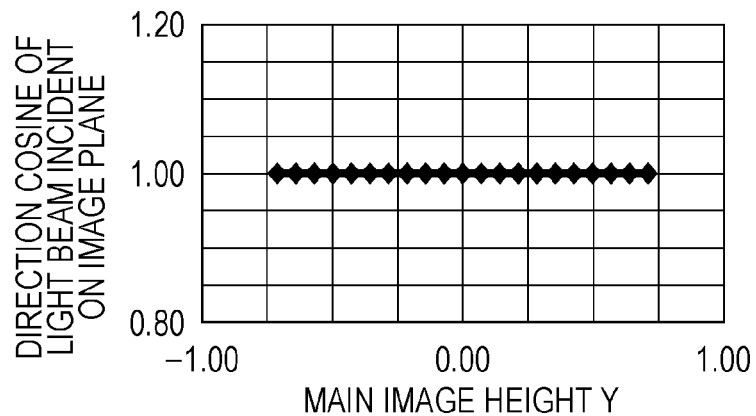
FIG. 5A is a chart illustrating direction cosine of a light beam incident on an image plane in a central imaging system of Example 1.

FIG. 5A is a chart illustrating direction cosines of a light beam incident on the light receiving surface 71a being the image plane, in the central imaging system 2a. FIG. 5A plots the direction cosines of the chief ray of the central imaging system 2a for each of major image heights. The closer to 1 the direction cosine of the chief ray incident on the image plane, the higher the telecentricity of the optical system. When FIG. 5A is observed from this point of view, the direction cosines of the chief ray incident on the light receiving surface 71a being an image plane at each of main image heights Y are substantially 1.0, indicating that the present Example is an optical system telecentric on the image side. Although illustration is omitted, the similar applies to the object side, and thus, bi-telecentricity is achieved.

1-b: Lower Imaging System

Data of the lower imaging system 2b will be described below. Table 4 tabulates the coordinates of the surface vertex of the optical surface of the imaging lens (first imaging lens) 5d, the aperture 5e, and the imaging lens (second imaging lens) 5f constituting the lower imaging system 2b.

TABLE 4

| | X | Y | Z | Angle |
|---|---|---|---|---|
| Light emitting point group | −3.600 | −1.217 | −1.400 | 21.251 |
| Exit surface of light emitting substrate | −3.600 | −1.217 | −0.700 | |
| Front surface of first imaging lens | −3.600 | −1.217 | 1.700 | |
| Lens substrate | −3.600 | −1.217 | 2.600 | 16.260 |
| | −3.598 | −1.217 | 3.301 | 16.260 |
| Back surface of first imaging lens | −3.598 | −1.217 | 4.200 | |
| Aperture substrate | −3.599 | −1.217 | 7.300 | 11.004 |
| | −3.645 | −1.217 | 7.991 | 11.004 |
| Front surface of second imaging lens | −3.645 | −1.217 | 10.400 | |
| Lens substrate | −3.645 | −1.217 | 11.300 | 5.553 |
| | −3.645 | −1.217 | 12.000 | 5.553 |
| Back surface of second imaging lens | −3.645 | −1.217 | 12.900 | |
| Surface of photoconductor | −3.467 | −1.217 | 16.000 | |

The free curved surface shape of the lower imaging system 2b is tabulated in Table 5.

TABLE 5

| | 0 | 2 | 4 | 6 | 8 | 10 |
|---|---|---|---|---|---|---|
| Front surface of first imaging lens | | | | | | |
| 0 | 0.00000E+00 | 1.21823E−01 | −2.02218E−03 | −7.90000E−05 | 7.80000E−05 | 0.00000E+00 |
| 2 | 1.36172E−01 | −1.51912E−02 | 9.24275E−04 | −2.95927E−04 | 0.00000E+00 | 0.00000E+00 |
| 4 | −2.13618E−03 | 1.04460E−03 | −1.90637E−04 | 0.00000E+00 | 0.00000E+00 | 0.00000E+00 |

TABLE 5-continued

| | | | | | |
|---|---|---|---|---|---|
| 6 | 1.77570E−03 | −2.23712E−04 | 0.00000E+00 | 0.00000E+00 | 0.00000E+00 | 0.00000E+00 |
| 8 | −7.00000E−05 | 0.00000E+00 | 0.00000E+00 | 0.00000E+00 | 0.00000E+00 | 0.00000E+00 |
| 10 | 0.00000E+00 | 0.00000E+00 | 0.00000E+00 | 0.00000E+00 | 0.00000E+00 | 0.00000E+00 |

| | i | | | | | |
|---|---|---|---|---|---|---|
| j | 0 | 2 | 4 | 6 | 8 | 10 |

Back surface of first imaging lens

| | | | | | | |
|---|---|---|---|---|---|---|
| 0 | 0.00000E+00 | −1.47270E−01 | 3.96788E−03 | −4.28285E−04 | 9.90000E−05 | 0.00000E+00 |
| 2 | −1.37525E−01 | 4.25893E−03 | −6.94636E−04 | −2.92276E−04 | 0.00000E+00 | 0.00000E+00 |
| 4 | 4.32248E−03 | −1.38829E−03 | 3.56225E−04 | 0.00000E+00 | 0.00000E+00 | 0.00000E+00 |
| 6 | 7.41427E−04 | −1.97164E−04 | 0.00000E+00 | 0.00000E+00 | 0.00000E+00 | 0.00000E+00 |
| 8 | 1.70211E−04 | 0.00000E+00 | 0.00000E+00 | 0.00000E+00 | 0.00000E+00 | 0.00000E+00 |
| 10 | 0.00000E+00 | 0.00000E+00 | 0.00000E+00 | 0.00000E+00 | 0.00000E+00 | 0.00000E+00 |

Front surface of second imaging lens

| | | | | | | |
|---|---|---|---|---|---|---|
| 0 | 0.00000E+00 | 1.40863E−01 | −4.68838E−03 | 2.66854E−04 | −9.40000E−05 | 0.00000E+00 |
| 2 | 1.39106E−01 | −5.76994E−03 | 3.03764E−03 | −2.92296E−04 | 0.00000E+00 | 0.00000E+00 |
| 4 | −3.96931E−03 | 3.50987E−03 | −1.97550E−03 | 0.00000E+00 | 0.00000E+00 | 0.00000E+00 |
| 6 | −4.46120E−04 | 1.75910E−04 | 0.00000E+00 | 0.00000E+00 | 0.00000E+00 | 0.00000E+00 |
| 8 | −1.20038E−04 | 0.00000E+00 | 0.00000E+00 | 0.00000E+00 | 0.00000E+00 | 0.00000E+00 |
| 10 | 0.00000E+00 | 0.00000E+00 | 0.00000E+00 | 0.00000E+00 | 0.00000E+00 | 0.00000E+00 |

Back surface of second imaging lens

| | | | | | | |
|---|---|---|---|---|---|---|
| 0 | 0.00000E+00 | −1.28805E−01 | 1.54870E−03 | −1.67987E−04 | −4.60000E−05 | 0.00000E+00 |
| 2 | −1.34679E−01 | 1.33759E−02 | 7.26074E−04 | −1.57304E−04 | 0.00000E+00 | 0.00000E+00 |
| 4 | 2.48752E−03 | 1.58330E−03 | −8.90448E−04 | 0.00000E+00 | 0.00000E+00 | 0.00000E+00 |
| 6 | −1.10794E−03 | −1.70000E−05 | 0.00000E+00 | 0.00000E+00 | 0.00000E+00 | 0.00000E+00 |
| 8 | −2.00000E−06 | 0.00000E+00 | 0.00000E+00 | 0.00000E+00 | 0.00000E+00 | 0.00000E+00 |
| 10 | 0.00000E+00 | 0.00000E+00 | 0.00000E+00 | 0.00000E+00 | 0.00000E+00 | 0.00000E+00 |

Figure 5B:
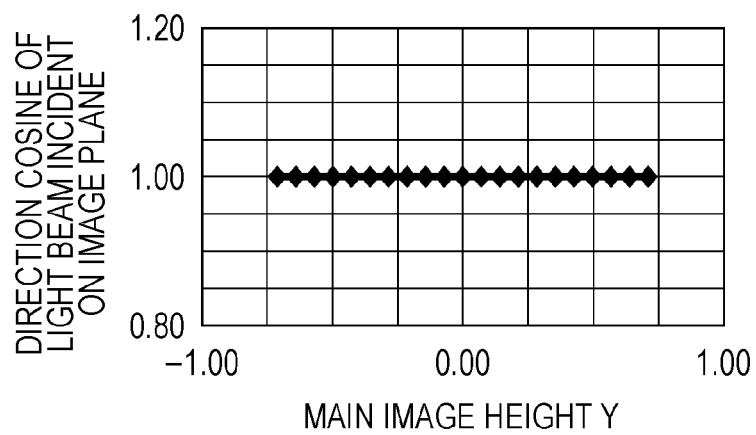
FIG. 5B is a chart illustrating direction cosine of a light beam incident on a lower imaging system of Example 1.

FIG. 5B is a chart illustrating a direction cosine of a light beam incident on the light receiving surface 71a, which is an image plane, in the lower imaging system 2b. As apparent from the chart, it is observed that the light beam is incident on the light receiving surface 71a from the normal direction regardless of the image height and that the telecentricity is ensured. Although illustration is omitted, the similar applies to the object side, and thus, bi-telecentricity is achieved.

1-c: Upper Imaging System

Data of the upper imaging system 2c will be described below. Table 6 tabulates the coordinates of the surface vertex of the optical surface of the imaging lens (first imaging lens) 5d, the aperture 5e, and the imaging lens (second imaging lens) 5f constituting the upper imaging system 2c.

TABLE 6

| | X | Y | Z | Angle |
|---|---|---|---|---|
| Light emitting point group | 3.600 | 1.217 | 1.400 | 21.251 |
| Exit surface of light emitting substrate | 3.600 | 1.217 | 2.100 | |
| Front surface of first imaging lens | 3.600 | 1.217 | 3.800 | |
| Lens substrate | 3.600 | 1.217 | 4.700 | 16.260 |
| | 3.602 | 1.217 | 5.401 | 16.260 |
| Back surface of first imaging lens | 3.602 | 1.217 | 6.300 | |
| Aperture substrate | 3.601 | 1.217 | 8.700 | 11.004 |
| | 3.556 | 1.217 | 9.391 | 11.004 |
| Front surface of second imaging lens | 3.555 | 1.217 | 11.100 | |
| Lens substrate | 3.555 | 1.217 | 12.000 | 5.553 |
| | 3.555 | 1.217 | 12.700 | 5.553 |
| Back surface of second imaging lens | 3.555 | 1.217 | 13.600 | |
| Surface of photoconductor | 3.553 | 1.217 | 16.000 | |

The free curved surface shape of the upper imaging system 2c is tabulated in Table 7.

TABLE 7

| | i | | | | | |
|---|---|---|---|---|---|---|
| j | 0 | 2 | 4 | 6 | 8 | 10 |

Front surface of first imaging lens

| | | | | | | |
|---|---|---|---|---|---|---|
| 0 | 0.00000E+00 | 1.66238E−01 | −7.41886E−03 | 4.66025E−04 | 2.10000E−05 | 0.00000E+00 |
| 2 | 1.78669E−01 | −2.49595E−02 | 5.17059E−03 | −8.43984E−04 | 0.00000E+00 | 0.00000E+00 |
| 4 | −8.44021E−03 | 4.47746E−03 | −7.64745E−04 | 0.00000E+00 | 0.00000E+00 | 0.00000E+00 |
| 6 | 5.37050E−03 | −9.02698E−04 | 0.00000E+00 | 0.00000E+00 | 0.00000E+00 | 0.00000E+00 |
| 8 | −5.40325E−04 | 0.00000E+00 | 0.00000E+00 | 0.00000E+00 | 0.00000E+00 | 0.00000E+00 |
| 10 | 0.00000E+00 | 0.00000E+00 | 0.00000E+00 | 0.00000E+00 | 0.00000E+00 | 0.00000E+00 |

Back surface of first imaging lens

| | | | | | | |
|---|---|---|---|---|---|---|
| 0 | 0.00000E+00 | −1.75209E−01 | 6.20475E−03 | −7.55924E−04 | 1.02471E−04 | 0.00000E+00 |
| 2 | −1.64749E−01 | 1.76102E−02 | −1.55387E−03 | −2.82446E−04 | 0.00000E+00 | 0.00000E+00 |
| 4 | 6.18801E−03 | −3.35738E−03 | 1.33259E−03 | 0.00000E+00 | 0.00000E+00 | 0.00000E+00 |
| 6 | 1.53565E−03 | −2.47129E−04 | 0.00000E+00 | 0.00000E+00 | 0.00000E+00 | 0.00000E+00 |

TABLE 7-continued

| | | | i | | | |
|---|---|---|---|---|---|---|
| j | 0 | 2 | 4 | 6 | 8 | 10 |
| 8 | 4.39339E−04 | 0.00000E+00 | 0.00000E+00 | 0.00000E+00 | 0.00000E+00 | 0.00000E+00 |
| 10 | 0.00000E+00 | 0.00000E+00 | 0.00000E+00 | 0.00000E+00 | 0.00000E+00 | 0.00000E+00 |
| | | | Front surface of second imaging lens | | | |
| 0 | 0.00000E+00 | 1.69213E−01 | −7.32249E−03 | 6.69496E−04 | −1.36386E−04 | 0.00000E+00 |
| 2 | 1.75813E−01 | −1.67911E−02 | 5.33812E−03 | −6.17638E−04 | 0.00000E+00 | 0.00000E+00 |
| 4 | −4.20998E−03 | 6.51323E−03 | −4.28998E−03 | 0.00000E+00 | 0.00000E+00 | 0.00000E+00 |
| 6 | −6.87340E−04 | 2.91959E−04 | 0.00000E+00 | 0.00000E+00 | 0.00000E+00 | 0.00000E+00 |
| 8 | −2.03791E−04 | 0.00000E+00 | 0.00000E+00 | 0.00000E+00 | 0.00000E+00 | 0.00000E+00 |
| 10 | 0.00000E+00 | 0.00000E+00 | 0.00000E+00 | 0.00000E+00 | 0.00000E+00 | 0.00000E+00 |
| | | | Back surface of second imaging lens | | | |
| 0 | 0.00000E+00 | −1.72189E−01 | 6.28753E−03 | −5.65222E−04 | −3.70000E−05 | 0.00000E+00 |
| 2 | −1.67494E−01 | 2.35123E−02 | −1.32804E−03 | −1.80000E−05 | 0.00000E+00 | 0.00000E+00 |
| 4 | 1.00134E−02 | 8.05918E−04 | −1.67590E−03 | 0.00000E+00 | 0.00000E+00 | 0.00000E+00 |
| 6 | −3.31814E−03 | 3.22529E−04 | 0.00000E+00 | 0.00000E+00 | 0.00000E+00 | 0.00000E+00 |
| 8 | 2.03081E−04 | 0.00000E+00 | 0.00000E+00 | 0.00000E+00 | 0.00000E+00 | 0.00000E+00 |
| 10 | 0.00000E+00 | 0.00000E+00 | 0.00000E+00 | 0.00000E+00 | 0.00000E+00 | 0.00000E+00 |

Figure 5C:
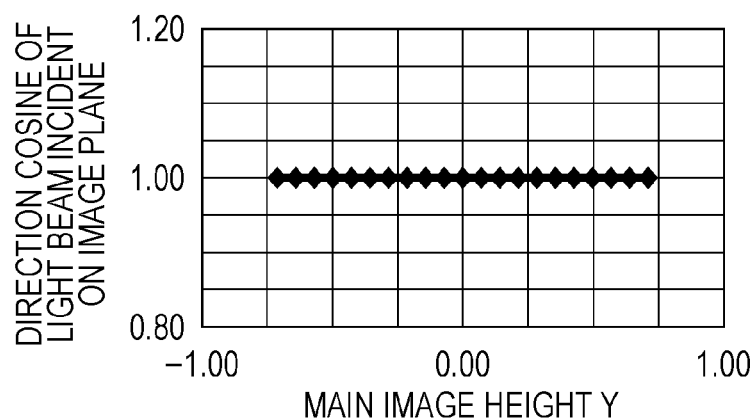
FIG. 5C is a chart illustrating direction cosine of a light beam incident on an image plane in an upper imaging system of Example 1.

FIG. 5C is a chart illustrating a direction cosine of a light beam incident on the light receiving surface 71a being an image plane, in the upper imaging system 2c. As apparent from the chart, it is observed that the light beam is incident on the light receiving surface 71a from the normal direction regardless of the image height and that the telecentricity is ensured. Although illustration is omitted, the similar applies to the object side, and thus, bi-telecentricity is achieved.

Although the image forming apparatus and the optical print head as specific embodiments have been described above, the image forming apparatus according to the present invention is not limited to the above. For example, the number of imaging systems constituting the optical system 73b is not limited to three, and may be two, or four or more.

In Example 1, the imaging magnification β of the optical system 73b is −1. However, the imaging magnification β of the optical system 73b can be enlarged with an absolute value larger than 1 and reduced with an absolute value smaller than 1. Note that the imaging magnifications β of the imaging systems 2a to 2c constituting the optical system 73b need not be strictly equal, in which case the magnification difference can be compensated by changing the arrangement of the light emitting points ED constituting the light emitting point group DG and other elements.

Although not illustrated, a transparent glass plate may be disposed between the light receiving surface 71a of the photoconductive drum 71 and the second lens array A2. Covering the optical system 73b with a glass plate makes it possible to prevent dust adhesion to the second imaging lens 5f or the like.

The specific example regarding the number and arrangement of the light emitting points ED constituting the light emitting point group DG is merely an exemplification, and the number and arrangement of the light emitting points ED can be changed to suit the application and purpose.

Intervals of the imaging systems 2a to 2c in the sub scanning direction or Z direction may not be equal. For example, centers of three first imaging lenses 5d having different positions regarding the sub scanning direction of the imaging systems 2a to 2c need not be strictly arranged on the second plane PLb. Similarly, centers of the three second imaging lenses 5f having different positions regarding the sub scanning direction of the imaging systems 2a to 2c need not be strictly arranged on the fourth plane PLd.

According to an embodiment of the present invention, the lens shape, in the vicinity of the optical axis, of the plurality of imaging lenses constituting the first lens array is biconvex, and the lens shape, in the vicinity of the optical axis, of the plurality of imaging lenses constituting the second lens array is biconvex. In this case, the center of the thickness of the imaging lens can be made closer to the central point of the principal point interval. The closer the center of the thickness of the imaging lens comes to the central point of the principal point interval, the higher the telecentricity becomes.

According to another embodiment of the present invention, the plurality of imaging lenses of the first lens array is formed on an identical lens substrate, the plurality of imaging lenses of the second lens array is formed on an identical lens substrate, and a plurality of apertures is formed on an identical aperture substrate. In this case, since the lens array and aperture array are on an identical substrate, it is easy to maintain uniformity of magnification even when an arrangement error occurs.

According to another embodiment of the present invention, the aperture substrate is a transparent body, and a light shielding part for shielding light exists on one surface of the aperture substrate. This configuration enables formation of the aperture position and the aperture shape with higher accuracy, leading to enhanced bi-telecentricity.

According to another embodiment of the present invention, the aperture substrate is formed of glass. This configuration enables suppression of the influence of linear expansion due to heat while maintaining the transparency of the opening, making it easy to maintain magnification uniformity.

According to another embodiment of the present invention, the lens substrate on which the first and second lens arrays are formed is formed of glass, and a lens surface on the lens substrate is formed of resin. This configuration enables suppression of the influence of linear expansion due to heat while maintaining the degree of freedom of the lens shape and the transparency of the lens, making it easy to maintain magnification uniformity.

According to another embodiment of the present invention, a light emitting element forming the light emitting point group is an organic EL element. In this case, there is a possibility that the organic EL elements are three-dimensionally arranged stepwise in view point of increasing the arrangement density, and it becomes easy to adapt the imaging system to such a three-dimensional arrangement.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
   a photoconductor having a surface conveyed in a sub direction substantially orthogonal to a main direction;
   a light emitting substrate having a plurality of two-dimensionally arrayed light emitting point groups; and
   a plurality of imaging optical systems that images light from the plurality of light emitting point groups onto mutually different positions on the photoconductor,
   wherein an optical axis of each of the plurality of imaging optical systems are parallel to one another,
   imaging magnifications of the plurality of imaging optical systems are substantially equal for each of the light emitting point groups,
   the plurality of imaging optical systems includes: a first lens array having a plurality of imaging lenses arranged to face the light emitting point groups; a second lens array having a plurality of imaging lenses each arranged to face each of the plurality of imaging lenses constituting the first lens array; and a plurality of apertures arranged between the first and second lens arrays so as to face the plurality of imaging lenses,
   central points of the light emitting point group exist in a first plane which is substantially an identical plane,
   central points of the plurality of imaging lenses constituting the first lens array exist in a second plane which is substantially an identical plane,
   central points of the plurality of apertures exist in a third plane which is substantially an identical plane,
   central points of the plurality of imaging lenses constituting the second lens array exist in a fourth plane which is substantially an identical plane,
   the first plane forms a non-zero predetermined angle with respect to a plane perpendicular to an optical axis direction, and
   the angle formed with respect to the plane perpendicular to the optical axis direction is greater in the order of the first plane, the second plane, the third plane, and the fourth plane.

2. The image forming apparatus according to claim 1, wherein the first plane, the second plane, the third plane, and the fourth plane are inclined in the sub direction with respect to the plane perpendicular to the optical axis direction.

3. The image forming apparatus according to claim 1, wherein, when the angle between the first plane and the plane perpendicular to the optical axis direction is $\theta_a$, the angle between the second plane and the plane perpendicular to the optical axis direction is $\theta_b$, the angle between the third plane and the plane perpendicular to the optical axis direction is $\Theta_c$, and the angle between the fourth plane and the plane perpendicular to the optical axis direction is $\theta_d$, $\theta_a \neq 0$ holds and the following relationship:

$$\theta_a > \theta_b > \theta_c > \theta_d$$

is satisfied.

4. The image forming apparatus according to claim 3, wherein, when imaging magnification at a time of combining the imaging lens constituting the first lens array and the corresponding imaging lens constituting the second lens array is $\beta$,
   the angles $\theta_a$, $\theta_b$, and $\theta_c$, and $\theta_d$ satisfy the following relationship:

$$\frac{\alpha(1+2\beta)}{2+2\beta}\theta_a < \theta_b < \frac{\gamma(1+2\beta)}{2+2\beta}\theta_a$$

$$\frac{2\alpha\beta}{2+2\beta}\theta_a < \theta_c < \frac{2\gamma\beta}{2+2\beta}\theta_a$$

$$\frac{\alpha\beta}{2+2\beta}\theta_a < \theta_d < \frac{\gamma\beta}{2+2\beta}\theta_a$$

wherein $\alpha=0.9$, and $\gamma=1.1$.

5. The image forming apparatus according to claim 1, wherein the lens shape, in the vicinity of the optical axis, of the plurality of imaging lenses constituting the first lens array is biconvex, and the lens shape, in the vicinity of the optical axis, of the plurality of imaging lenses constituting the second lens array is biconvex.

6. The image forming apparatus according to claim 1, wherein the plurality of imaging lenses of the first lens array is formed on an identical lens substrate,
   the plurality of imaging lenses of the second lens array is formed on an identical lens substrate, and
   the plurality of apertures is formed on an identical aperture substrate.

7. The image forming apparatus according to claim 6, wherein the aperture substrate is a transparent body, and a light shielding part for shielding light exists on one surface of the aperture substrate.

8. The image forming apparatus according to claim 6, wherein the aperture substrate is formed of glass.

9. The image forming apparatus according to claim 6, wherein the lens substrate on which the first and second lens arrays are formed is formed of glass, and a lens surface on the lens substrate is formed of resin.

10. The image forming apparatus according to claim 1, wherein a light emitting element forming the light emitting point group is an organic EL element.

11. The image forming apparatus according to claim 1, wherein the light emitting point groups are arranged in a substantially parallelogram.

* * * * *